Sept. 20, 1966 R. E. THURSTON 3,273,696

BELT POSITIONING DEVICE

Filed Jan. 27, 1965

United States Patent Office 3,273,696
Patented Sept. 20, 1966

3,273,696
BELT POSITIONING DEVICE
Robert E. Thurston, Amherst, N.H., assignor to Improved Machinery Inc., Nashua, N.H., a corporation of Delaware
Filed Jan. 27, 1965, Ser. No. 428,320
5 Claims. (Cl. 198—202)

The present invention relates to a belt positioning device for controlling the position of a traveling belt axially on its supporting rolls.

The invention is herein disclosed as embodied in mechanical filter of the general type having an endless traveling belt of mesh wire which may be up to 10 or 12 feet wide, passing around a main cylinder of large diameter and around a number of auxiliary cylinders and guide rolls for the performance of a filter operation.

My improvement is particularly, but by no means exclusively, applicable for the control of wide endless belts such, for example, as the wide wire mesh filter belt above referred to which is not readily controlled by edge gages or other standard devices.

It is a principal object of the invention to provide a novel and improved belt positioning device for controlling the lateral position of a traveling belt trained about one or a series of supporting rolls.

It is a further object of the invention to provide a novel belt support roll assembly constructed and arranged to effect shifting movements of the traveling belt axially of the roll and thereby to control the position of the belt on the roll.

It will be understood, however, that the invention in its broader aspects is not limited to the control of wide wire mesh belts of the type referred to, but is equally applicable for the lateral control of narrow belts which may be of other materials and regardless of the rate of operation of the belts.

With the above and other objects in view as may hereinafter appear, the several features of the invention will be readily appreciated by one skilled in the art from the following description taken in connection with the accompanying drawing in which:

FIG. 1 is an exploded view of elements of a support roll assembly around which the belt is trained including a support shaft, a sleeve bearing element which is keyed to the shaft having the bearing surface thereof tilted with respect to the shaft axis, and a narrow belt support roll which is mounted on the tilted bearing surface of the sleeve bearing element to rotate in a plane skewed from the perpendicular to the axis of the support shaft;

Figure 1:
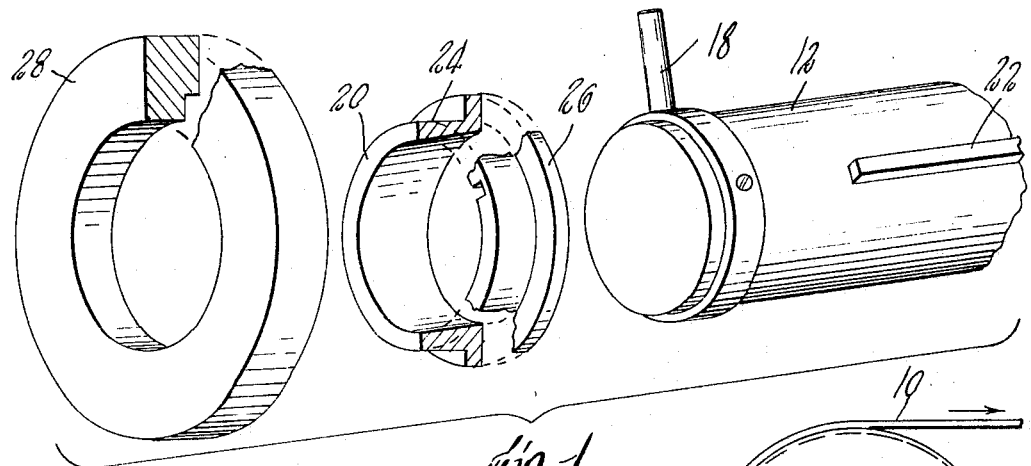
Figures 2, 3, 4:
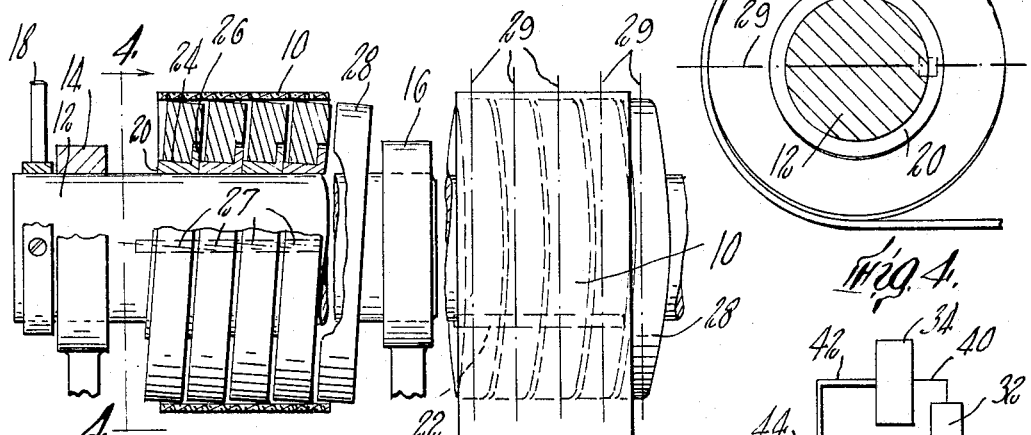
FIG. 2 is a view partly in section of the support roll assembly with the middle portion thereof broken away, illustrating one extreme position of the belt adjusting mechanism in which the belt is being shifted along the axis of the roll assembly to the right.
FIG. 3 is a top plan view of substantially the parts shown in FIG. 2.
FIG. 4 is a sectional view taken on a line 4—4 of FIG. 2.
Figure 7:
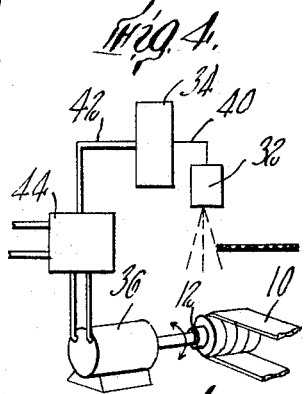
Figures 5, 6:
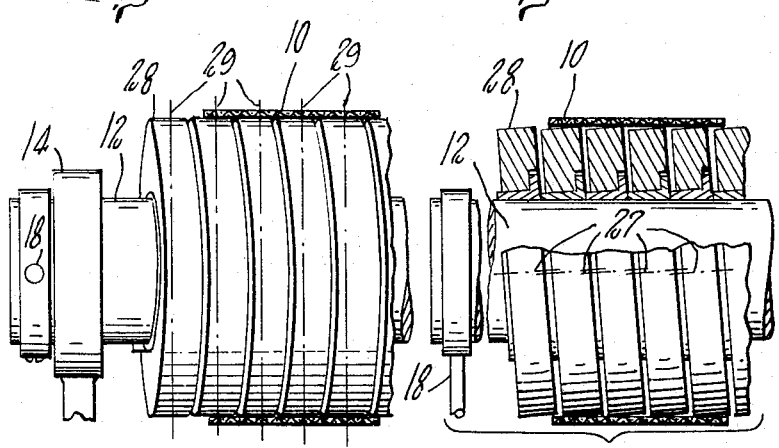
FIG. 5 is a view in side elevation similar to FIG. 2, but with the manual controller and support shaft rocked through a 90° angle to an intermediate position in which the forces tending to move the belt in opposite directions are neutralized.

FIG. 6 is a view similar to FIGS. 2 and 5 in which the manual controller and support shaft have been rocked a further 90° to the extreme downward position in which the belt is moved to the left; and FIG. 7 is a somewhat diagrammatic view of an automatic control device controlled by a proportional controller including a belt edge sensor and a controller responsive to signals from said sensor produced by movement of the web to effect compensatory rocking movements of the support shaft of the roller assembly.

The invention is disclosed in a preferred form in the drawing as embodied in a support roll assembly for use in a mechanical filter which may be of the general type having a wide wire mesh belt which passes around a large diameter filter drum, and around a plurality of guide and operating rolls, only one such belt support roll being here shown about which the wire mesh belt is wrapped approximately 180°.

Referring specifically to the drawing, a support roll assembly around which a wire mesh belt 10 is trained in a 180° wrap is shown as embodying in a preferred form the several features of the invention. The illustrated support roll assembly comprises a support shaft 12 which extends transversely the width of the belt 10 and is rotatably supported adjacent each end in bearing brackets 14, 16. At the left hand end of the shaft as shown in FIGS. 2, 5 and 6, there is provided a manual control handle 18 which projects radially outwardly from the shaft 12. A series of sleeve bearing elements 20 and mounted adjacent one another along the length of the shaft and are keyed against rotational movement relative thereto by means of a key 22 mounted in a keyway in the periphery of the support shaft 12 for engagement in corresponding slots formed in the hubs of the sleeve bearing elements 20. Each sleeve bearing element is provided with a cylindrical bearing surface 24 and with an outwardly extending edge flange 26. The bearing surfaces 24 including the edge flanges 26 of the bearing elements 20 are tilted with respect to the support shaft axis on parallel axes 27, each intersecting said support shaft axis. The sleeve bearing elements 20 provide support for a series of identical narrow cylindrical belt supporting rolls 28 which are thus supported to rotate in parallel planes tilted with relation to the support shaft 12 about transverse axes 29 provided by a transverse diameter of each sleeve element 20 and roll 28 which perpendicularly intersects the axis of the support shaft 12.

The operation of the support roll assembly for controlling the position of the traveling belt 10 lengthwise of said assembly will be described particularly in connection with FIGS. 2 to 6, inclusive, of which FIG. 5 shows the belt shifting elements of the support roll assembly in an intermediate neutral position. The belt 10 is shown as moving into engagement and subsequently out of engagement with the support roll assembly in parallel horizontal planes, thus producing a 180° wrap of belt 10 about said support roll assembly.

For the neutral position of the support roll assembly shown in FIG. 5, the support shaft 12 and tilted bearing surfaces provided thereon are turned so that the transverse diameter perpendicularly intersecting the shaft axis about which the bearing surfaces and rolls 28 are tilted faces squarely that portion of the belt which is wrapped about the rolls. As will be evident from an inspection of FIG. 5 those portions of the peripheral surfaces of the rolls 28 engaging the belt portions constituting the entering lower half of the wrap are urging the belt to the left, whereas those portions of said peripheral surfaces engaging the leaving upper half wrap portion of the belt are urging the belt to the right. The forces tending to move the belt to the left and to the right are equal and cancel out. As will be evident from an inspection of FIG. 5, belt 10 entering the wrap at the lower side of the assembly tends to be shifted to the left until a midpoint of the wrap is reached whereupon this engaging portion of the belt is urged to the right as the belt portion moves upwardly to the point of disengagement at the top of said assembly. Since the forces generated tending to move the belt in the two directions are equal and opposite the belt has no tendency to move.

If the manual controller handle 18 is now moved upwardly to the position of FIG. 2, that is, through a 90° angle, the diametrical transverse axis about which the individual belt supporting rolls 28 are tilted is correspondingly rotated through a 90° angle so that the rolls 28 are now tilted in a direction transversely of the wrap. For the position of FIG. 2 the peripheral surfaces of the rolls 28 engaging the lower entering wrap portion of the belt, and also those peripheral portions engaging the upper leaving wrap portion of the belt are both moving to the right and thus combine to urge the belt along the axis of the support assembly to the right. Similarly, a downward movement of the control element 18 to the position of FIG. 6 will produce a reverse position of the support rolls 28 from that of FIG. 2 so that for the position of FIG. 6 those portions of the peripheral surfaces of the rolls 28 engaging the belt throughout the entire extent of the belt wrap of the belt 10 are moving to the left, and thus combine to shift the belt to the left.

The belt shifting mechanism above described is manually operated by shifting the control handle 18 so that the desired lateral adjustment of the belt 10 is effected in the selected direction along the axis of the support shaft 12 to a desired position. When the belt has been brought to the desired position the manual controller is shifted to the intermediate neutral position of FIG. 5 to prevent further creep of the belt in either direction.

FIG. 7 of the drawings illustrates an alternative automatic control for the belt shifting mechanism by means of which the belt 10 is maintained continuously in a desired operating zone laterally upon the rolls about which the belt is trained. A proportional controller of a type well known in the art is shown which comprises a position sensing device 32 which measures the direction and amount of belt displacement, a controller 34 which is responsive to signals emitted from the sensing device, and a motor 36 which receives its driving impulses from the controller 34 and is connected to turn the shaft 12 90° in either direction. In the illustrated construction the interrupted light beam sensor 32 is connected by wiring 40 with the controller 34, which is in turn connected by a compressed air line 42 with an air operated flow control valve 44 which in turn controls the operation of the motor 36 here shown as a rotary hydraulic motor. The controller 34 acts to effect an operation of the flow control valve mechanism 44 which will produce a correctional rotational movement of the shaft 12 which is in the required direction and which is proportional to the displacement of the belt 10 so that the belt will be maintained at all times in the desired operating zone. Inasmuch as proportional controllers of this general description are well known in the art and since the proportional controller employed forms specifically no part of the invention, no further illustration or description thereof is believed necessary.

The invention having been described what is claimed is:

1. Apparatus for controlling the position of a traveling belt transversely on guide rolls and like supports against which the belt is trained in a partial wrap having, in combination, a support roll assembly comprising a support shaft rotatable on an axis, said shaft having a series of circular bearing surfaces disposed in parallel planes with parallel axes each tilted with respect to and intersecting the axis of said support shaft, and with parallel transverse diameters perpendicularly intersecting said shaft axis, a series of rolls having belt engaging peripheral surfaces freely rotatable on said bearing surfaces in said parallel planes, said supporting shaft and bearing surface supported rolls having a neutral angular position on said support shaft axis in which said transverse diameters perpendicularly intersecting the support shaft axis are transverse to the roll engaging wrap portion of said belt so that the extent of peripheral surface of each said roll engaging said belt having an axial movement in one direction is balanced by an equal extent of peripheral surface engaging said belt having an axial movement in the opposite direction, said supporting shaft and bearing surface supported rolls having alternative angularly disposed belt shifting positions at each side of said intermediate neutral position.

2. Apparatus for controlling the position of a traveling belt transversely on guide rolls and like supports against which the belt is trained in a partial wrap having, in combination, a support roll assembly comprising a support shaft rotatably adjustable about a longitudinal axis, a series of belt engaging rolls arranged in parallel relationship along the length of said shaft, said rolls being rotatable about axes tilted about parallel transverse diameters of said rolls passing perpendicularly through said support shaft axis so that the peripheral surface of each said roll when rotating moves first in one and then in the other direction axially of said support shaft, said support shaft and tilted rolls having a neutral position of angular adjustment on said support shaft axis in which said roll transverse diameters are transverse to the roll engaging wrap portion of said belt, so that the extent of peripheral surface of each said roll engaging said belt having a movement axially of said support shaft in one direction is balanced by an equal extent of peripheral surface engaging said belt having a movement axially in the opposite direction, said support shaft and tilted rolls having angularly adjusted positions at each side of said neutral position in which a preponderant portion of the engaged peripheral surface of the belt is moving axially in one direction to effect a shifting movement of the belt, and means to control the angular position of said support shaft and tilted rolls.

3. Apparatus for controlling the position of a traveling belt transversely on guide rolls and like supports against which the belt is trained in a partial wrap according to claim 2 in which a manual controller connected with said shaft is operable to rock said shaft to any desired position of angular adjustment and thereby to control the position of said belt axially of said shaft.

4. Apparatus for controlling the position of a traveling belt transversely on guide rolls and like supports against which the belt is trained in a partial wrap according to claim 2 in which an automatic control device is provided for maintaining said belt in a desired position axially of said shaft comprising a belt position sensing device responsve to shifting movements of said belt axially of said support shaft, and a shaft rocking device actuated by said belt position sensing device upon movement of the belt axially in either direction for rocking said shaft to effect a feeding movement of the belt axially in the opposed direction.

5. Apparatus for controlling the position of a traveling belt transversely on guide roll and like supports against which the belt is trained in a partial wrap according to claim 2, in which an automatic controller is provided for maintaining the belt within a desired operating zone laterally upon said rolls, which comprises a motor connected for driving said shaft alternately in opposite directions, a sensing device for signaling the direction and amount of belt displacement from said zone, and a controller responsive to said signals controlling said motor to effect a correctional rotational movement of said shaft in a direction opposed to and in an amount proportioned to the extent of displacement of the belt.

References Cited by the Examiner

UNITED STATES PATENTS

| | | |
|---|---|---|
| 2,075,111 | 3/1937 | Gulliksen et al. |
| 3,196,701 | 7/1965 | Morrow _____ 198—202 X |
| 3,203,536 | 8/1965 | Shaw _____ 198—184 |

EVON C. BLUNK, *Primary Examiner.*

R. KRISHER, *Assistant Examiner.*